April 7, 1959

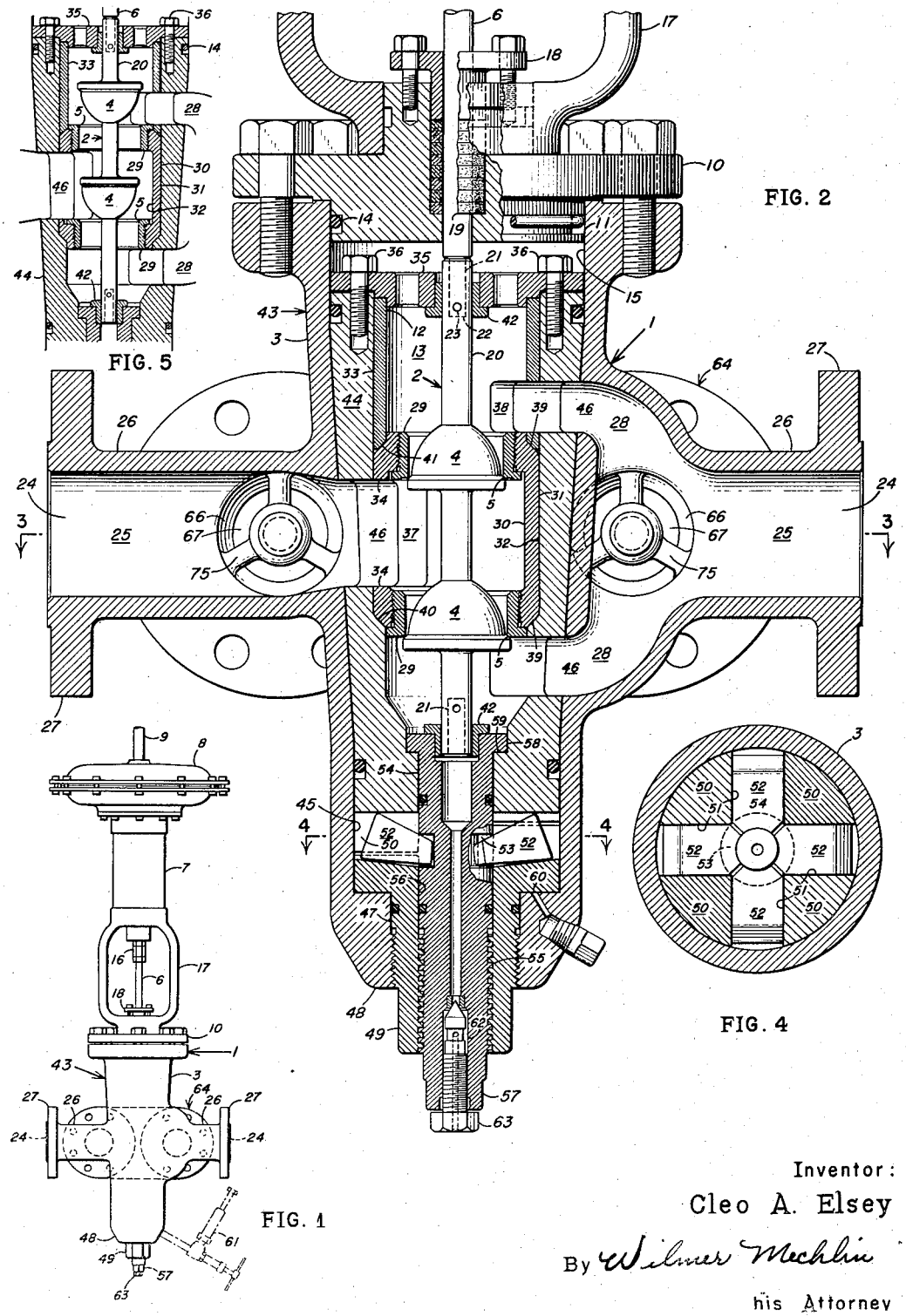

C. A. ELSEY 2,880,748

MOTOR VALVE STRUCTURE

Filed Aug. 2, 1954

Inventor:
Cleo A. Elsey
By Wilmer Mechlin
his Attorney

United States Patent Office 2,880,748
Patented Apr. 7, 1959

2,880,748

MOTOR VALVE STRUCTURE

Cleo A. Elsey, Bartlesville, Okla.

Application August 2, 1954, Serial No. 446,993

8 Claims. (Cl. 137—270)

This invention relates to automatic control valves in which a controlled force is applied through force-responsive means to the valve stem for actuating the latter and automatically regulating the flow of fluid through a line. Such valves herein are termed "motor valves" and in their most usual form have their stems actuated by pressure-responsive diaphragms and are known as "diaphragm motor valves."

In the numerous applications of motor valves for automatically regulating the flow of oil, gas, chemicals or other fluids, it has heretofore been the practice to install with each valve a by-pass, a by-pass valve and a pair of block or cut-off valves, one of the latter at either side of the motor valve. While expensive, such an installation is considered essential to enable the total flow under certain circumstances to be divided between the by-pass and the motor valve or, and more importantly, to permit the motor valve to be blocked off without interrupting flow through the line, when it is necessary to repair or replace the parts of the valve.

It is an object of the present invention to provide a motor valve structure containing in addition to a motor valve, the several valve components required for regulated by-passing or complete blocking-off of the motor valve.

Another object of the invention is to provide a motor valve, wherein each of the several valves is of such construction and arrangement as to enable it and its associated valve seat to be removed for repair or replacement without use of the usual cut-off valves.

Another object of the invention is to provide a motor valve wherein the inner valve mechanism is contained within an axial cylindrical bore of a plug valve and has its valve seat or seats carried and positioned therein by exteriorly cylindrical sleeving, whereby the entire inner valve mechanism may readily be removed from the valve casing.

A further object of the invention is to provide an improved motor valve wherein the inner valve mechanism of the motor valve is removably mounted within a plug valve, which is rotatable within the valve casing to block off the valve mechanism, thereby enabling the latter to be removed for repair or other purpose.

An additional object of the invention is to provide a motor valve having its inner valve mechanism mounted within a plug valve, wherein the valve seat or seats of the mechanism are carried by an exteriorly cylindrical cage which normally seats in the plug valve and, with the valve seats, may be released and slid as a unit out of the valve casing.

A further object of the invention is to provide a motor valve having the valve seat or seats of its inner valve mechanism carried by a cage removably seated in the valve casing, wherein the entire inner valve mechanism is enabled to be removed as a unit and, on being turned end-for-end, to convert the motor valve from a normally open to a normally closed valve, or vice versa.

Other objects and advantages of the invention will appear hereinafter in the detailed description, be particularly pointed out in the appended claims, and be illustrated in the accompanying drawings, in which:

Figure 1 is an elevational view of a preferred form of the combined valve of the present invention;

Figure 2 is a fragmentary vertical sectional view on an enlarged scale of the valve of Figure 1, taken along the lines 2—2 of Figure 3;

Figure 4 is a horizontal sectional view taken along the lines 4—4 of Figure 2; and Figure 5 is a fragmentary view taken on the same section as Figure 2, but on a smaller scale, and showing the inversion of certain of the parts to convert the motor valve of Figure 2 to a normally open valve.

Figure 3:
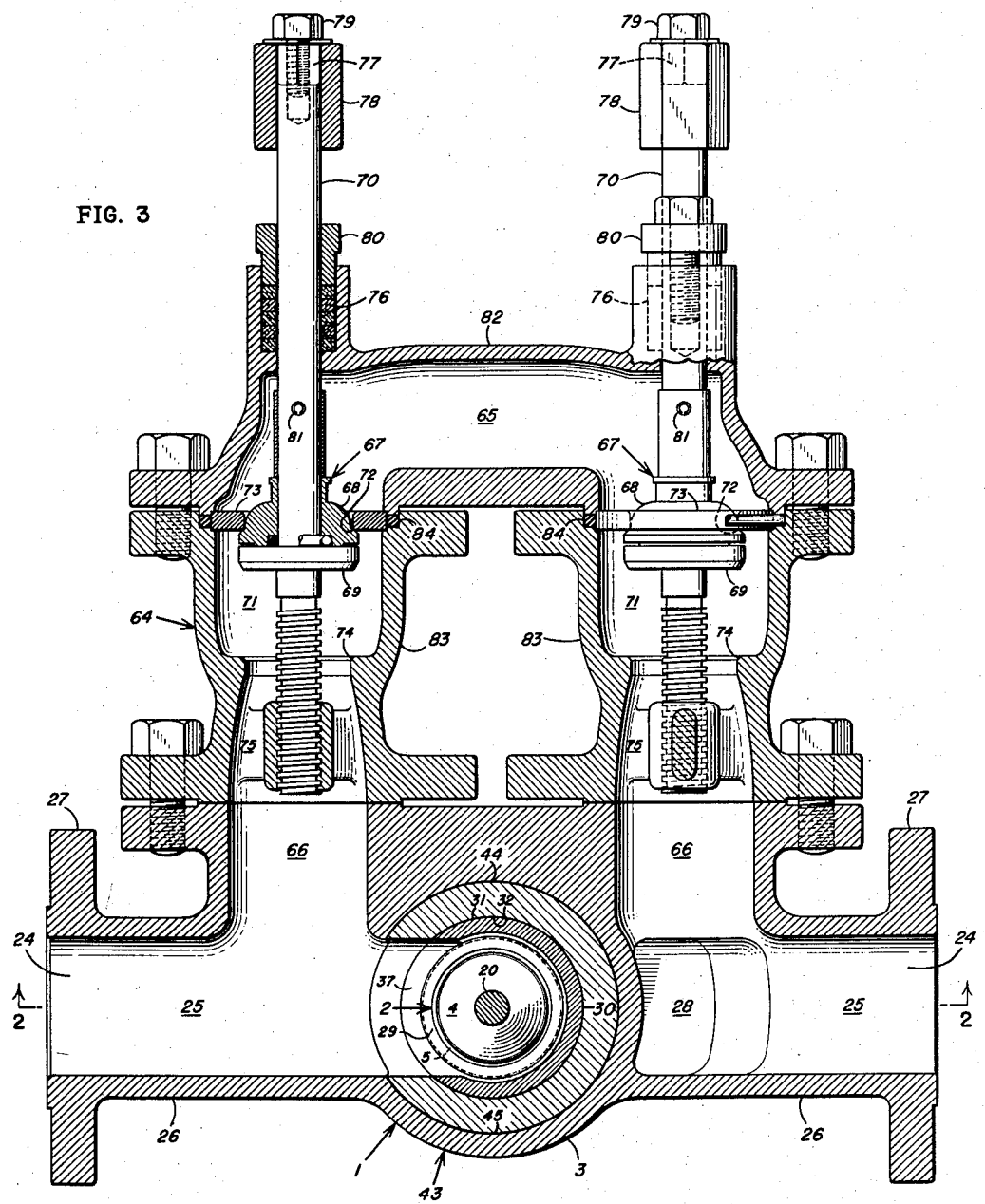
Figure 3 is a horizontal sectional view taken along the lines 3—3 of Figure 2.

Referring now in detail to the drawings, in which like reference characters designate like parts, the motor valve structure of the present invention is comprised of a motor valve designated as 1, which in its exemplary form is a diaphragm motor valve and which has as its inner valve mechanism 2 contained or mounted within a valve body or casing 3. As in conventional motor valves, the inner valve mechanism 2 may have one or more regulating or throttling valves or valve disks or valve elements 4, usually globe valves, each of which has an associated vave seat 5. Also conventionally, the valve or valves 4 are reciprocable axially of the valve casing 3 for regulating flow of fluid therethrough and are reciprocated through an actuating stem 6 by the usual counteracting diaphragm and spring (not shown) housed within a superstructure 7. Fluid for applying controlled pressure to the diaphragm and thereby axially shifting and determining the position of the valves 4 relative to their seats 5, enters the dome 8 of the superstructure 7 through tubing 9.

The superstructure 7 is carried by a bonnet 10 closing an opening 11 in the valve casing 3 demarking the upper extremity 12 of the valve chamber or central bore 13 of the valve casing 3 in which the inner valve mechanism 2 is mounted, the bonnet there being shown as projecting into the valve casing and sealing the opening by an O ring 14 bearing aginst the side wall 15 defining the opening 11. Above the bonnet 10 the valve stem 6 is jointed as at 16, the joint 16 being accessible through the open, ring-shaped or bowed intermediate portion 17 of the superstructure 7 for the reason hereinafter to be explained. The actuating stem 6 extends through the bonnet 10, being guided therein by a guide bushing 18 and sealed by packing 19 held in place by the bushing 18. It will be noted that the actuating stem, proper, terminates within the valve chamber 13 slightly below the bonnet 10 and is there connected to a valve stem 20 formed integrally with the valve or valves 4, the actuating stem 6 being connectable to either end of the valve stem 20 by suitable means such as the end sockets 21 in the valve stem in which the lower end 22 of restricted cross-section of the actuating stem is adapted to be received, the actuating and valve stems then being fixed against relative axial movement by a pin 23.

It has been mentioned that the inner valve mechanism 2 of the motor valve 1 may have one or more valves 4, the usual arrangement and that of the motor valve here illustrated utilizing a pair of valves or valve disks 4 integral with and spaced axially of the valve stem 20 and associated valve seats 5, this arrangement having the advantage over one using a single valve disk, of providing a balanced valve in which the pressure exerted by the fluid in the valve chamber is divided between the two disks, thus decreasing the diaphragm pressure needed to operate the valve and correspondingly increasing its sensitivity. It will be understood, however, as the description proceeds, that either a single or a multiple valve arrangement may be utilized in the motor valve of the present invention.

For either a single or the illustrated multiple valve disk motor valve, the valve casing 3 contains a passage ported at either end and interrupted intermediate its ends by the valve chamber 13. In the form shown, the casing is ported transversely by substantially aligned inlet and outlet ports 24, one disposed on either side of the casing and both connected to the valve chamber 13 by passages 25 in cross-arms or arms 26 formed integrally with the valve casing, the cross-arms having flanged ends 27 through which the valve structure is adapted to be connected in the line whose flow it is intended to control. In the illustrated motor valve, one of the passages 25 leads to the valve chamber 13 between or intermediate the valve seats 5, and the other is branched to include or straddle the valve seats, each of the valve seats thus being interposed between a main passage to one of the ports and one of the branch passages 28 to the other port.

In the conventional motor valve the valve seats are formed in inserts threaded or otherwise removably secured to a part of the valve casing 3 so as to permit them to be removed separately for repair or replacement. In the motor valve of the instant invention the valve seats 5, as well, are formed in removably threaded inserts 29, but these inserts, instead of being threaded into a part of the casing, are threadedly secured to and carried by a cage or sleeving 30, fitting or seating in the valve chamber 13. The cage 30, in turn, is designed to be slid into and out of the valve chamber and for this purpose has a cylindrical outer wall 31 slidably engaging the cylindrical inner wall 32 of the valve chamber. Normally, the cage 30 is positioned or held against movement axially or longitudinally of the valve chamber by a sleeve or sleeving 33 pressing or bearing against the upper or outer of the end portions 34 of the cage, the cage and sleeve being fixed, locked or held in place by a locking plate 35 surmounting the sleeve and itself fixed, locked or secured in position relative to the casing, as by axially extending bolts 36, extending axially thereof. Lateral openings 37 and 38 are provided in the cage and sleeve, respectively, for communication between the valve seats 5 and the inlet and outlet ports 24.

As shown in Figure 2, the opening 37 is positioned substantially midway longitudinally of the cage 30 and the cage has a pair of longitudinally or axially spaced, oppositely facing counterpart annular shoulders 39, one at or adjacent either end. Either of these shoulders is designed and adapted to abut, engage or bear against an instanding annular abutment 40 carried by the valve casing and defining the inner or lower end of the cylindrical wall 32 of the valve chamber 13, the opposite shoulder then abutting an annular abutment 41 on the lower or inner end of the sleeve 33.

It has been mentioned that the locking plate 35 serves to hold the cage 30 and sleeve 33 against movement axially of the valve chamber 13. In the illustrated embodiment the locking plate also serves to secure the cage and sleeve against relative rotative movement, as well, and thus to maintain alignment of the lateral openings 37 and 38 with corresponding openings in the valve casing and ensure access to the inlet and outlet ports 24. To this end, the shoulders 39 on the cage are beveled or conically tapered, the abutments 40 and 41 of the valve casing and sleeve are of corresponding configuration and the locking plate is spaced above its seat. With this construction the locking plate 35, on tightening of the bolts 36, acts through the sleeve 33 to wedge both the sleeve and cage into position and by the surface bearing between the several beveled faces, secures the sleeve and cage against rotative movement relative to the valve chamber. If desired, the cage and sleeve may also be keyed to the wall 32 of the valve chamber by suitable means (not shown), to facilitate alignment of their openings 37 and 38 on installation.

The double-endedness of the cage 30 enables it to be reversed or inverted so that its valve seats will face either towards or away from the opening 11 at the upper or outer end of the valve chamber. As mentioned, the valve stem 20 is connectable at either end to the actuating stem 6, and, as shown in Figure 2, the valve disks are offset axially of the valve stem so that its end portions, outwardly of the valve disks, are of unequal length. This difference in length is such that when the cage and stem are reversed or inverted, the motor valve will be converted from the normally closed valve shown in Figure 2 to a normally open valve, the term "normally," as here used, denoting the position of the valve disks relative to their seats in the absence of pressure upon the controlling diaphragm. It will also be noted, from Figure 2, that when two valve disks are used and they face in the same direction, the valve disks and their seats may be of unequal size so that the valve disk seating within the cage will pass through the valve seat of the other valve, thus eliminating the necessity of first removing the valve disk carrying the latter valve seat in the assembly of the inner valve mechanism.

In conversion of the motor valve from normally open to normally closed or vice versa, as well as in repair or replacement of the valve disks and their seats, the actuating stem is first separated at the accessible joint 16 within the open intermediate portion 17 of the superstructure 7. The bonnet 10 is then unbolted from the valve casing and, with the superstructure, slid off the lower portion of the valve seat, thus exposing the locking plate 35. Unbolting of the latter, in turn, exposes the inner valve mechanism 2 of the motor valve and enables the mechanism to be slid as a unit from the valve chamber 13. If the motor valve is then converted into a normally open valve by inversion of the valve disks and cage, since there will be no change in the overall length of the valve stem, the latter will reciprocate equally whichever end is uppermost, its alignment with the valve seats and the actuating stem during such reciprocation being ensured by guide bushings 42 engaging either end portion of the valve stem 20, one carried by the locking plate 35 and the other by the valve casing 3.

Were the construction of the motor valve limited to that above-described, removal of its inner valve mechanism would require the motor valve to be installed in a line in series with a pair of block or cut-off valves, one at either side, so as to block the motor valve from the line. The necessity for such separate valving is here obviated by mounting the inner valve mechanism 2 within a plug valve 43 which is interposed between the valve mechanism and the casing 3 and is mounted for rotation about the axis of the valve mechanism to shut off or block the flow of fluid therethrough whenever necessary. The plug 44 of the plug valve 43, which surrounds the inner valve mechanism is, in general, of inverted frusto-conical shape to enable it to fit tightly into a well or bore 45 of corresponding configuration extending axially or longitudinally of the valve casing 3. Normally open to flow of fluid through the inner valve mechanism by transverse openings 46 aligning with the branch passages 28 and one of the main passages 25, and corresponding openings 37 in the cage 30 and 38 in the sleeve 33, the plug 44, on rotation through 90° or, more preferably, 180°, will wall off the inner valve mechanism from the inlet and outlet ports 24, thus effectively blocking off the motor valve and enabling its inner valve mechanism to be removed.

Since its use will be infrequent and its surface contact with the casing is large, the plug 44 will be subject to freezing in open position after extended use. It is therefore preferred to employ a plug valve having in-built unfreezing means such as are contained in the plug valves of my copending application, S.N. 380,704, filed September 17, 1953. As in the plug valves of that application, the plug 44 and the well 45 are both cylindrical adjacent their upper and lower extremities so as to maintain surface contact during dislodgement and rotation of the plug and thus ensure proper centering. The unfreezing means here shown is quite similar to that of the first embodiment of my copending application, the plug 44 having a separate actuating stem 47 which projects through the end 48 of the valve casing 3 opposite that carrying the bonnet 10 and, outwardly of the casing, has a hex or like head 49 so that it may be turned by a wrench. Also, as in the first embodiment of my copending application, the actuating stem 47 and plug 44 have interfitting sector-shaped teeth 50 on their confronting ends, the teeth being separated circumferentially by radially arranged circumferentially spaced guideways or guide slots 51, each bounded by teeth of both members and each containing a wedge or cam 52. The inner ends of the several cams seat or fit in an annular groove 53 in a wedge-actuating stem 54, which, towards its outer end, threadedly engages an internally threaded portion 55 of an axial bore 56 in the plug-actuating stem 47 and, outwardly of the latter, has a hex or like head 57, similar to that 49 of the actuating stem 47, also to permit its rotation by a wrench. Towards its inner end the wedge-actuating stem 54 extends into the plug 44, ending therewithin in an integral laterally projecting annular flange 58 laterally overlapping an abutment 59 on the plug.

With this construction, turning of the wedge-actuating stem 54 causes the wedges 52 to apply pressure axially upon the plug 44, displacing the latter axially of the well 45 in the valve casing. Once free, the plug is rotated 180° through its actuating stem 47, the wedges 52 then serving to transmit torque from the actuating stem to the plug. On completion of rotation of the plug to the desired position, turning out of the wedge-actuating stem 54 exerts an axial pull on the plug through the overlap between the projecting flange 58 and the abutment 59 and seats the plug tightly in its new position.

With its several parts sealed, as by O rings, against axial leakage, the plug valve may have its operating mechanism lubricated through a normally plugged duct 60 leading to the guideways 51 and adapted to take a lubricant-applying fitting 61, such as shown in phantom in Figure 1. It will be noted that the wedge-actuating stem 54 is axially bored as at 62, the upper portion to receive part of the valve stem 20 during reciprocation of the latter, and the lower portion normally closed by a drain plug 63, the latter on partial release permitting any fluid entrapped in the wedge-actuating stem to be drained therefrom while the plug valve is in closed position. It will also be noted that the locking plate 35, while previously described as bolted to means carried by the valve casing, may conveniently be bolted directly to the upper end of the plug 44. Of inverted frusto-conical shape and thus narrower at its lower than at its upper end, the plug valve may readily be installed in the valve casing through the end 11 of the well of the latter normally closed by the bonnet 10.

The motor valve structure of this invention includes not only the motor valve and in-built means in the form of the plug valve 43 for blocking flow through the motor valve, but also the remaining elements separately provided in the usual motor valve installation, a by-pass and valve means for controlling flow therethrough. In the illustrated embodiment there is attached to and rigid with one side of the valve casing 3 a housing or casing 64 containing or housing a by-pass or by-pass conduit or passage 65, the by-pass here being of substantially U-shape and aligned with and open at either end to one of a pair of by-pass ports 66 in the valve casing 3, which intersect and open off of and are disposed substantially normal to the passages 25 in the arms 26 on opposite sides of the valve chamber 13 in the main casing 3.

The usual separate by-pass has but one by-pass valve for throttling flow of fluid through it. That of the motor valve structure of the present invention may have one or two throttling valves, one sufficing for regulating the division of flow through the motor valve 1 and the by-pass 65, but two being needed and of a particular type, to enable a throttling valve and its seat to be repaired or replaced without blocking flow to the valve chamber 13. Two such by-pass valves, spaced relative to each other along the by-pass 65, are here shown, both designated as 67 and both preferably multiple valves of the type shown in my copending application, Serial No. 324,792 filed December 8, 1952, and now Patent No. 2,836,190, in which a throttling or regulating valve 68 and a cut-off valve 69 are mounted on the same actuating stem 70. Each of the multiple valves 67 is mounted in and interrupts one of the legs 71 of the by-pass conduit 65 with its throttling valve 68 seatable in a valve seat 72 formed in a removable and reversible insert or disk 73. The cut-off valve 69 of each multiple valve may be mounted back-to-back with the associated throttling valve 68 and is adapted to seat in a seat 74 which may conveniently be formed in the by-pass housing 64, the actuating stem 70 inwardly of its cut-off valve 69 towards the associated by-pass port 66 being externally threaded for threaded engagement with an internally threaded spider 75 interrupting the leg 71 adjacent the by-pass port.

Each of the actuating stems 70 of the by-pass valves 67 projects or extends substantially normal to the vertical axis of the valve casing 3 through a suitably packed opening 76 in the by-pass housing 64 and therebeyond ends in a head 77 to which is normally keyed the upper end portion of a collar 78 held against axial dislodgement relative to the actuating stem 70 by a bolt 79 threaded into the end of the stem. The purpose of this hex or like-sided collar 78 is to take a wrench so that the valve stem 70 may be screwed in or out to vary the opening through the throttling valve seat 72 and at the same time to limit the extent of this reciprocable movement by abutting against a guide bushing 80 closing the opening 76, so as to normally prevent the cut-off valve 69 from seating in its seat 74 since, otherwise, an operator in opening the throttling valve might inadvertently turn the stem sufficiently far to close the cut-off valve 69. With this arrangement, it is a simple matter, when blocking is desired, to reverse or invert the collar so that the stem may be turned down to the point where the cut-off valve seats in its seat.

It has been mentioned that the inserts 73 in which the seats 72 of the throttling valves 68 are formed, are removable and it will also be noted that the throttling valves 68, while normally pinned to their actuating stems 70, are slidable axially thereof on removal of the retaining pins 81. It, therefore, is only necessary to make the by-pass housing 64 of multipiece construction, with a header 82 bolted or otherwise removably attached to the leg-containing portion 83 of the housing, to permit access to the throttling valves and their seats. Such access and removability is facilitated by seating the inserts 73 in confronting annular grooves 84 formed in the header 82 and leg-containing portion 83 of the housing.

While either of the cut-off valves 69 is capable of blocking flow through the by-pass 65, the use of but one such valve would leave the by-pass open to line fluid on either side of the cut-off valve, unless flow through the valve chamber 13 were at the same time cut off either by the motor valve 1 or by its surrounding plug valve 43. With the disclosed two by-pass valves flow through the by-pass can be blocked completely by seating both cut-off valves, enabling the header 82 to be removed and one or both of the throttling valves 68 and their seats 72 to be removed and repaired or replaced, without interrupting flow through the motor valve.

From the above detailed description it will be apparent that there has been provided a motor valve structure wherein the several valves conventionally installed with a motor valve are contained in a single unit, the individual valves of which are of such construction and arrangement that any of the regulating or throttling valves and their seats may be repaired or replaced in situ without shutting down the line, and the motor valve of which may readily be converted, also in situ, from a normally open to a normally closed valve, or vice versa. It should be understood that the described and disclosed embodiment is merely exemplary of the invention and that all modifications are intended to be included which do not depart from either the spirit of the invention or the scope of the appended claims.

Having described my invention, I claim:

1. A motor value structure comprising a casing having a bore, a passage extending through said casing and intersected by said bore, valve seat means removably mounted in said bore, valve means reciprocable in said bore and seatable in said valve seat means for controlling flow through said passage, a housing rigid with said casing, a by-pass in said housing connected to said passage and by-passing said bore, valve seat means in said by-pass and removably mounted in said housing, valve means in said housing and shiftable relative to said last named seat means for regulating the division of flow between said by-pass and said bore, and cut-off valve means in said casing and associated with said reciprocable valve means for blocking flow through the valve seat means associated therewith and enabling said reciprocable valve means and the associated valve seat means to be removed without interrupting flow through said structure.

2. A motor valve structure comprising a casing having a bore, a passage extending through said casing and intersected by said bore, valve seat means removably mounted in said bore, valve means reciprocable in said bore and seatable in said valve seat means for controlling flow through said passage, a housing rigid with said casing, a by-pass in said housing connected to said passage and by-passing said bore, a pair of valve seats removably mounted in said housing and spaced along said by-pass, a pair of throttling valves in said housing and each seatable in and shiftable relative to one of said seats for regulating the division of flow between said bore and by-pass, and a plurality of cut-off valve means in said casing and housing and each associated with one of said reciprocable valve means and throttling valves for selectively blocking flow through the associated of said seat means and seats and enabling removal of any of said reciprocable valve means and throttling valves without interrupting flow through said structure.

3. A motor valve structure comprising a motor valve casing, a passage extending through said casing, a well in said casing intermediate the ends of and open to said passage, a frusto-conical plug in said well, said plug having openings normally aligning with and being rotatable to block said passage, an axial cylindrical bore in said plug, sleeving slidably insertible in said bore, valve seat means removably secured to said sleeving, means for releasably locking said sleeving and seat means in said bore, diaphragm-actuated valve means seatable in and shiftable axially of said bore relative to said seat means, a housing rigid with said casing, a by-pass in said housing and intersecting said passage at opposite sides of said well, a pair of valve seats removably mounted in said housing and spaced along said by-pass, a pair of throttling valves in said housing and each seatable in and shiftable relative to one of said seats for controlling the division of flow between said bore and by-pass, a cut-off valve connected to and shiftable with each of said throttling valves, and a valve seat in said housing for each of said cut-off valves, said plug and cut-off valves being selectively operable to block off the associated of said valve means and throttling valves and enable any of said valve means and throttling valves and the associated of said valve seat means and valve seats to be removed without interfering with flow through said structure.

4. A motor valve comprising a casing, a cylindrical bore in said casing, a double-ended cage slidable in said bore, valve seat means carried by and separable from said cage, means carried by said casing for releasably locking said cage in said bore, a passage extending through said casing and opening into said bore on opposite sides of said valve seat means, a diaphragm-actuated actuating stem mounted for reciprocation on said casing axially of said bore, a valve stem releasably connectable at either end to said actuating stem and projecting therefrom into said bore, valve means on and spaced axially of said valve stem, said cage and valve stem being slidable as a unit from said bore through an end thereof on blocking of flow into said bore from said passage, and said cage and valve stem being invertible for selective operation of said motor valve as a normally open or normally closed valve.

5. A motor valve comprising a valve casing having a cylindrical bore extending longitudinally thereof, a double-ended cage having an externally cylindrical surface slidably engaging said bore, a pair of valve seats of different cross-section releasably mounted on said cage in axially spaced relation, inlet and outlet ports in said casing and connectable through said valve seats, a diaphragm-actuated actuating stem mounted on said casing for reciprocation axially of said bore, a valve stem releasably connectable to said actuating stem and projecting therethrough into said bore, and a pair of valves mounted on and spaced axially of said valve stem in correspondence with the spacing of said valve seats and of corresponding difference in cross-sectional area, said valves together being offset towards one end of said valve stem, means carried by said casing for releasably locking said cage in said bore, and said cage and valve stem being slidable from said bore through an end thereof on blocking of flow thereinto and invertible as a unit for selective operation of said motor valve as a normally open or normally closed valve.

6. A motor valve comprising a valve casing, a well in and extending longitudinally of said casing and having a frusto-conical wall, spaced ports in said casing and connectable through said well, a plug in said well and having a frusto-conical surface seatable against said frusto-conical wall thereof, a bore in said plug and having a cylindrical wall, said plug having openings normally connecting said bore to said ports, actuating means projecting from said plug through said casing for rotation of said plug to close said openings, wedging means associated with said actuating means and operable externally of said casing for unseating said plug prior to rotation thereof, sleeving in said bore and cylindrically surfaced for slidable engagement with said wall thereof, valve seat means in said bore and carried and positioned by said sleeving to pass fluid between said ports, a locking plate releasably secured to said plug for locking said sleeving in said bore, and diaphragm-actuated valve means in said bore and shiftable axially thereof relative to said seat means for controlling flow therethrough, said sleeving, seat means and valve means being slidable from said bore through an end thereof on blocking of flow thereinto by rotation of said plug.

7. A motor valve comprising a valve casing, a well in and extending longitudinally of said casing and having a frusto-conical wall, spaced ports in said casing and connectable through said well, a plug in said well and having a frusto-conical surface seatable against said frusto-conical wall thereof, a bore in said plug and having a cylindrical wall, said plug having openings normally connecting said bore to said ports, actuating means projecting from said plug through said casing for rotation of said plug to close said openings, wedging means associated with said actuating means and operable externally of said casing for unseating said plug prior to rotation thereof, sleeving in said bore and cylindrically surfaced for slidable engagement with said wall thereof, valve seat means in said bore and carried and positioned by said sleeving to pass fluid between said ports, a locking plate releasably secured to said plug for locking said sleeve in said bore, a diaphragm-actuated valve stem mounted in and reciprocable axially of said bore, and valve means on said stem and seatable in said seat means, said sleeving, seat means and diaphragm-actuated stem being slidable from said bore through an end thereof on blocking of flow thereinto by rotation of said plug.

8. A motor valve comprising a casing, a well in said casing and having a frusto-conical wall, a plug in said well and having a frusto-conical surface in bearing engagement with said wall, an axial bore in said plug and having a cylindrical wall, ports in said casing and spaced by said well, openings in said plug normally connecting said ports to said bore, means projecting through said casing for rotation of said plug to close said openings, a cage in said bore and having a cylindrical outer surface slidably engaging said wall thereof, valve seat means carried by and removable from said cage, a sleeve slidable in said bore and acting against one end of said cage for urging the other end thereof into engagement with a confronting end of said bore, a locking plate removably secured to said plug and acting on said sleeve for locking said cage and sleeve in said bore, and diaphragm-actuated valve means in said bore and reciprocable axially thereof relative to said seat means for controlling flow therethrough, said cage, seat means and valve means being slidable from said bore through an end thereof on blocking of flow thereinto from said plug.

References Cited in the file of this patent
UNITED STATES PATENTS

| | | |
|---|---|---|
| 128,663 | Ross | July 2, 1872 |
| 1,486,111 | Larrabee | Mar. 4, 1924 |
| 1,648,986 | Gray | Nov. 15, 1927 |
| 1,991,032 | Spence | Feb. 12, 1935 |
| 2,008,125 | Bailey | July 16, 1935 |
| 2,399,111 | George | Apr. 23, 1946 |
| 2,633,862 | Dales | Apr. 7, 1953 |

FOREIGN PATENTS

| | | |
|---|---|---|
| 657,112 | Great Britain | Sept. 12, 1951 |